3,025,166
TREATMENT OF ANIMAL BY-PRODUCTS
Ward Harris Smith, Denver, Colo., assignor to Birko Chemical Corporation, Denver, Colo., a corporation of Washington
No Drawing. Filed Oct. 19, 1959, Ser. No. 847,048
4 Claims. (Cl. 99—107)

This invention relates to the treatment of animal products and more particularly it relates to an aqueous treatment of such animal products as offal, tallow and the like for cleaning, defatting, color brightening and the like.

In the meat packing industry animal by-products, that is, animal products other than muscle type meat for food consumption, constitute a valuable product. In many instances the profit made from the sale of animal by-products is essentially the only profit of the meat packing industry. Thus the handling and control of animal by-products is a matter of great importance and must be accomplished economically and in an expedient manner to maintain adequate control of the industry. Many by-products are utilized as food or food ingredients and, obviously, such by-products must be handled with extreme care to produce a clean, attractive product. Furthermore, the more attractive the product, the better the sales appeal.

According to the present invention I have discovered a new and highly efficient treatment of animal products which produces lighter colored products, cleans and defats such animal products faster and easier. The treatment includes the use of a percarbonate in an alkaline aqueous media which breaks up sugar residues on the animal products and actually increases the yield of animal by-products. The process of the invention includes a series of washing stages, and the percarbonate treatment increases the detergency action of the material used to clean the animal products. Also, the percarbonate treatment increases the solidity of the resultant animal products. In machine washing, e.g. a tripe scalder, the entire load may be completely treated which reduces time and labor. Thus all steps of washing and rinsing are conducted in the machine. In prior processes only the most valuable part of the tripe could economically be finished, whereas by the present method, the entire stomach may be treated. This speeds up the operation, saves labor and produces an entirely saleable product.

Included among the objects and advantages of the invention is a treatment of animal by-products which lightens the color of such products, and provides an efficient and highly effective cleaning and defatting treatment. The treaatment of the invention breaks up and removes sugar residues on animal by-products to thereby provide cleaner and more stable products with increased yields over known methods. The treatment, furthermore, may be efficiently applied to such products as casings to produce whitened casings, using more dilute treatment solutions and resulting in reduced toxic materials remaining in such casing products.

These and other objects and advantages of the invention may be readily ascertained by referring to the following description of a particular washing treatment of a particular animal product.

Tripe from a packing plant operation is treated according to the following, based on the requirements for washing 50 tripe in a tripe scalder:

(A) The tripe is cold rinsed for fifteen minutes in a solution of a detergent; such as caustic soda, soda ash, sal soda, sodium metasilicate, trisodium phosphate or a combination of these substances or lime or a combination of lime and sodium carbonate at a concentration of about five pounds per 50 gallons of water.

(B) The cold rinsed tripe is rinsed in cold water for about five minutes.

(C) The tripe is then subjected to a warm rinse of about 120° F. water for five minutes.

(D) The tripe from the warm rinse is then washed with a hot solution, about 135° F., for fifteen minutes using about three pounds of detergent in 50 gallons of water.

(E) The tripe is subjected to a hot rinse in water at 140° F. for a period of five minutes.

(F) The hot rinse is continued at 145° F. for another five minutes.

(G) Following the hot rinse of paragraph F, the tripe is washed in a sodium carbonate peroxide solution in the amount of seven ounces of the carbonate peroxide to 50 gallons of water at 150° F. for seven minutes.

(H) The tripe is then submitted to a warm rinse of 125° F. water for a period of five minutes.

(I) The tripe is then rinsed in two rinses of three minutes each in 70° F. water.

(J) The tripe is finally rinsed in 60° F. water for a period of three minutes and then withdrawn and allowed to drain.

The tripe resulting from the above treatment is a brilliant white color and the product is much faster rinsing, the second cold rinse showing clear water with a neutral pH indicated. The tripe is firm and solid with a honeycomb side extremely free of any precipitates. The fat side of the tripe is clean and a brilliant white with no traces of residue precipitate.

In the washing of any animal product in the category of offal, the product is initially cold washed with detergent and rinsed with cold water to wash away the major quantity of dirt and manure. The product is then rinsed in warm water to gradually raise the temperature and subsequently hot washed with a detergent to completely clean the animal by-product. The temperature must, obviously, be retained below the point of deleterious effects; for example, denaturing of protein matter by boiling water. The washed products are then hot rinsed, treated with an alkaline-sodium carbonate peroxide solution at an elevated temperature for a few minutes. Subsequent to this treatment the animal by-product is washed with clear water in stages of decreasing temperature to reduce residual chemicals on the product to a level substantially below any toxic levels and bring the temperature of the product to about room temperature. This treatment produces clean animal products of brilliant color, and such treatment requires substantially less time, with reduced labor requirements.

The sodium carbonate peroxide solution may be preferably prepared with caustic soda in a sufficient amount to maintain the treating solution slightly on the alkaline side (preferrably in the range of about 7.5 to 10) when treating the animal products. Other bases such as non-toxic carbonates, which includes sodium carbonate (soda ash), trisodium phosphate, sodium metasilicates, lime and the like may be used.

The detergent solutions used in the process for treating the animal products may be any of the detergents approved by various government health and safety organizations which normally regulate the meat packing industry.

While the invention has been described with reference to specific examples, there is no intent to limit the spirit or the scope of the invention to the precise details so set forth, except as defined in the following claims.

I claim:
1. The treatment of animal by-products which comprises initially washing such by-products in a cold wash solution of about one pound of detergent in ten gallons of water for a sufficient time to initially clean such by- products, rinsing the resultant washed by-products in water at about 120° F. for about five minutes, rewashing the by-products for about fifteen minutes in a 135° F. detergent solution containing about three pounds of detergent per fifty gallons of water, hot rinsing the rewashed by-products in about 140° F. water for about five minutes to substantially reduce residual detergent content thereof, washing for about seven minutes the rinsed by-products in a 150° F. solution containing about seven ounces of sodium carbonate peroxide in fifty gallons of water and having an alkalinity of from about 7.5 to about 10, rinsing the resultant washed by-products in water washes of decreasing temperature for a time sufficient to reduce residual chemical concentration below toxic levels and reduce the temperature of the by-products to about room temperature and obtain a substantially neutral pH of the final wash.

2. The treatment of animal by-products which comprises initially washing such by-products in a cold wash solution containing about one pound of detergent in ten gallons of water for about fifteen minutes to clean such by-products, rinsing the resultant washed by-products in water at about 120° F. for about five minutes, rewashing the by-products in a detergent solution containing about three pounds of detergent in fifty gallons of water at a temperature of about 135° F. for about fifteen minutes, hot rinsing the rewashed by-products in 140° F. water for about five minutes to reduce the detergent content of the by-products, washing for about seven minutes the rinsed by-products in a 150° F. alkaline solution in the pH range of 7.5 to 10 and containing about seven ounces of sodium carbonate peroxide in fifty gallons of water, rinsing the resultant washed by-products in water washes of progressively decreasing temperature for a time period sufficient to reduce residual chemical concentration thereof below the toxic level and to decrease the temperature of the by-products to about 60° F.

3. The treatment of animal by-products which comprises cold washing the by-products for about fifteen minutes in a solution of a detergent of a concentration of about five pounds per fifty gallons of water, said detergent being selected from the group consisting of caustic soda, soda ash, sal soda, sodium metasilicate, trisodium phosphate, a combination of the foregoing, lime, and a combination of lime and sodium carbonate, cold rinsing the resultant by-product in cold water for about five minutes, subjecting the resultant by-product to a warm rinse in about 120° F. water for about five minutes, subjecting the warm rinsed by-product to washing with a hot solution of about 135° F. for about fifteen minutes using about three pounds of detergent in fifty gallons of water, subjecting the resulting by-product to a wash in a sodium carbonate peroxide solution in the amount of seven ounces of sodium carbonate peroxide to about fifty gallons of water at about 150° F. for seven minutes and having an alkalinity of about 7.5 to about 10, subjecting the resultant by-product to a warm rinse of about 125° F. water for a period of about five minutes, subjecting the resultant warm rinsed by-product to two rinses of three minutes duration each in about 70° F. water, finally rinsing the by-product in water of about 60° F. for a period of three minutes, withdrawing the by-product and allowing it to drain.

4. In the treatment of animal by-products which includes initially washing such animal by-products with a series of detergent solution washes of increasing temperature to a wash temperature of about 135° F., the improvement which comprises the steps of washing such initially washed animal products for a period of time of about seven minutes in a sodium carbonate peroxide aqueous solution at a temperature of about 150° F., in which the sodium carbonate peroxide is present in an amount of about 7 oz. of the peroxide to about 50 gallons of water, and which said aqueous sodium carbonate peroxide solution is at a pH of about 7.5 and 10, and then rinsing the resultant washed animal by-products with sufficient water rinses of decreasing temperature starting from about 135° F. down to about room temperature so as to reduce the residual treatment chemicals on the animal by-products to about room temperature.

References Cited in the file of this patent

UNITED STATES PATENTS

| | | |
|---|---|---|
| 1,497,088 | Carey | June 10, 1924 |
| 1,855,925 | Pulley et al. | Apr. 26, 1932 |
| 2,482,731 | Gomeck | Sept. 20, 1949 |
| 2,766,121 | Mouton | Oct. 9, 1956 |

OTHER REFERENCES

"Casings," June 1936, by Dr. C. Robert Moulton, published by Meat Magazine, Chicago, pages 14 to 27, inclusive.